3,063,830
SEPARATION OF URANIUM, PLUTONIUM AND FISSION PRODUCTS FROM NEUTRON-BOMBARDED URANIUM
Allan E. Martin, Downers Grove, Irving Johnson, Clarendon Hills, Leslie Burris, Jr., Naperville, Irvin O. Winsch, Downers Grove, and Harold M. Feder, Park Forest, Ill., assignors to the United States of America as represented by the United States Atomic Energy Commission
No Drawing. Filed July 14, 1961, Ser. No. 124,237
6 Claims. (Cl. 75—84.1)

This invention deals with a pyrometallurgical method of separating uranium from plutonium and fission products contained together in neutron-bombarded uranium metal or oxide.

The process of this invention is applicable to uranium-containing fuel material and to blanket material as it is used in nuclear breeder reactors. In U.S. Patent No. 2,934,425 granted to James B. Knighton and Harold M. Feder on April 26, 1960, a process is described and claimed for the treatment of fuel and blanket materials of the type to which this invention is directed. There the uranium-containing material is dissolved in zinc at a temperature of about 800° C., and magnesium is then added in a quantity to obtain the magnesium-zinc eutectic (53.5% by weight of zinc and 46.5% by weight of magnesium) whereby uranium precipitates while plutonium and fission products remain dissolved in the eutectic. The uranium crystals according to the patent are separated from the eutectic by conventional means. The patent also covers a modification of the process just described which is applicable to the processing of a uranium-oxide-containing fuel or blanket material. According to this modification, the oxidic material is dissolved in a magnesium-zinc alloy, the magnesium serving as a reductant for the oxides to the metals, and after reduction and dissolution a further quantity of magnesium is added to adjust the alloy to the eutectic composition as is done in the first embodiment.

Heretofore it was believed that the uranium solubility in zinc steadily decreases with increasing magnesium concentration. It was most surprising when it was found that the uranium solubility in zinc increases steadily with an increasing magnesium concentration within the range of from 0 to about 12% by weight and that with an increase of magnesium beyond 12% the solubility of uranium decreases again steadily. In other words, there is a maximum solubility of uranium in zinc-magnesium at a magnesium concentration of about 12% by weight and a critical optimum range at a magnesium content of from about 10 to 18%. These findings are summarized in Table I.

TABLE I

| Magnesium Concentration, w/o | Uranium Solubility, w/o, 800° C. |
|---|---|
| 2 | 5.3 |
| 4 | 5.0 |
| 6 | 5.1 |
| 8 | 6.8 |
| 10 | 10 |
| 12 | 16 |
| 14 | 13.8 |
| 16 | 11.8 |
| 18 | 10.0 |
| 20 | 8.0 |
| 30 | 2.8 |
| 46 | 0.55 |
| 50 | 0.36 |
| 100 | $6 \times 10^{-3}$ |

It is obvious from this table that at 800° C. the uranium solubility is 16% when the magnesium content in the zinc is 12% and about 14% at a magnesium content of 14% and that both lesser or higher magnesium quantities yield lower degrees of solubility. These data were utilized in devising the process of this invention.

It is an object of this invention to provide a process for the separation of uranium values from plutonium and/or fission product values that comprises dissolution of the material to be treated in a zinc-base metal in which comparatively small volumes of metal are required.

It is thus also an object of this invention to provide a process for the separation of uranium values from plutonium and/or fission product values which comprises dissolution of the material to be treated in a zinc-base metal for which comparatively small containers can be used.

It is a further object of this invention to provide a process for the separation of uranium values from plutonium and/or fission product values comprising dissolution of the material to be treated in a zinc-base metal and isolation of the separated plutonium and fission products by volatilization of metals associated therewith in which process a relatively small amount of metal has to be volatilized.

It is also an object of this invention to provide a process for the separation of uranium values from plutonium and/or fission product values comprising dissolution of the material to be treated in a zinc-base metal which operates with a comparatively small quantity of said zinc-base metal and thus is inexpensive.

It is finally also an object of this invention to provide a process for the separation of uranium values from plutonium and/or fission product values comprising dissolution of the material to be treated in a zinc-base metal in which the dissolution rate is relatively great.

The process of this invention comprises dissolving neutron-bombarded uranium in a molten binary zinc-magnesium alloy in which the magnesium content ranges between 10 and 18% by weight; adding further magnesium to the metal solution until the zinc-magnesium ratio corresponds to the eutectic composition, whereby crystals of uranium precipitate, while the plutonium and fission products remain dissolved in the eutectic; separating the crystals from the metal solution; and separating the plutonium and the fission products from the metal solution by evaporating the zinc and magnesium.

While, as has just been stated, the magnesium content for the dissolution of the uranium material may range between 10 and 18% by weight of the binary alloy, a content of between 12 and 14% is preferred (see Table I). The quantity of zinc-magnesium alloy is kept as low as possible in order to have the most advantageous conditions. An about fivefold amount of zinc, as to that of the uranium metal to be treated, was found to be satisfactory. The process of dissolution as well as precipitation of the uranium is best carried out at a temperature between 800 and 850° C. Separation of the uranium may be accomplished by any conventional methods, such as centrifugation, filtration and decantation.

The following comparison (Table II) illustrates clearly the advantage of this process over that of U.S. Patent No. 2,934,425 summarized in the introduction of this specification. In this table, volumes as well as weights of the metals are juxtaposed that have to be added for processing 10 kg. (=0.513 liter) of metallic uranium. The advantage of the new process is more pronounced when volumes are compared because of the low density of magnesium.

TABLE II

| Additions in Subject Process | | | | Additions in USP No. 2,934,425 | | | |
|---|---|---|---|---|---|---|---|
| Magnesium | | Zinc | | Magnesium | | Zinc | |
| kg. | l. | kg. | l. | kg. | l. | kg. | l. |
| DISSOLUTION | | | | | | | |
| 8.5 | 4.9 | 52 | 7.3 | ------ | ----- | 190 | 26.7 |
| URANIUM PRECIPITATION | | | | | | | |
| 43.5 | 25 | ------ | ------ | 190 | 109 | ----- | ------ |

For the sake of simplicity, the zinc-magnesium eutectic in this theoretical comparison was assumed to be the 50:50 alloy (parts by weight).

An about fivefold amount of zinc with respect to uranium was used in the process of this invention, and 8.5 kg. of magnesium were added to obtain a concentration of about 14%. After dissolution, the alloy was brought to about eutectic composition by the addition of a further amount of magnesium, namely 43.5 kg. In contradistinction thereto, the process of the patent required 190 kg. of zinc for the dissolution of the 10 kg. of uranium, because the solubility of uranium in zinc is only about 5% (see Table I). In order then to obtain eutectic composition, about 190 kg. of magnesium had to be added.

Thus the total metal necessary in the process of this invention for the treatment of 10 kg. of uranium is 104 kg. or 37.3 liters, while according to that of U.S.P. No. 2,934,425 a total quantity of 380 kg. of metal or 135.7 liters have to be added. Furthermore, while in the patented process the alloy obtained by dissolution had a uranium concentration of 5% only, the process of this invention results in an about 14% alloy.

The process of this invention is applicable primarily to the processing of metallic and oxidic uranium masses that have been subjected to neutron bombardment. In the case of a metallic mass, it is simply introduced into the zinc containing the critical amount of magnesium, namely between 10 and 18% by weight. If, however, the neutron-irradiated uranium material is an oxide mixture, the critical magnesium amount of from 10 to 18% is added to the zinc, and then an additional quantity of magnesium is incorporated to bring about the reduction of the oxides without affecting the critical magnesium quantity. This second quantity of magnesium should be sufficient to bring about a reduction of the oxides, but any excess thereover should be carefully avoided so that the magnesium content is still within the critical range after the reduction of the oxides and an optimal dissolution of the uranium metal formed is obtained.

In the following, an example is given for the purpose of illustrating the process of this invention.

Example

About 418 grams of uranium contining 1% by weight of plutonium were dissolved in a 14 w/o magnesium-zinc solution at 800° C. The melt was contained in a tantalum crucible and was agitated by means of a motor-driven tantalum agitator. A helium atmosphere at a pressure of about 5 p.s.i.g. was maintained over the melt.

Samples of the melt were taken from time to time in tantalum sample tubes and analyzed. The results indicate that after 4 hours essentially all of the uranium and plutonium initially charged was in solution.

After completion of the dissolution step, additional magnesium was charged to the melt to produce a zinc-magnesium solution containing 50% by weight of magnesium. Filtered samples, using tantalum tubes with tantalum filter frits were taken at 800, 680, 530, and 440° C. The results are shown in Table III.

TABLE III

| Temperature (° C.) | Plutonium Concentration (w/o) | Uranium Solubility (w/o) |
|---|---|---|
| 800 | 0.089 | 0.262 |
| 680 | 0.091 | 0.165 |
| 530 | 0.091 | 0.069 |
| 440 | 0.092 | 0.025 |

The above results indicate that the plutonium concentration remained constant when the temperature was decreased and that all of the plutonium had remained in the metal solution, 0.091% by weight being the theoretical plutonium content. The uranium solubility decreased from 0.262 w/o at 800° C. to 0.025 w/o at 440° C., which is due to the precipitation of uranium from the metal solution.

The plutonium:uranium ratio can be further increased by reducing the volume of the solution; this is done by distilling portions of the zinc and magnesium, which causes additional uranium to precipitate.

It will be understood that the invention is not to be limited by the details given herein but that it may be modified within the scope of the appended claims.

What is claimed is:

1. A process of purifying neutron-bombarded uranium material, comprising introducing said material in the metallic condition into a molten binary zinc-magnesium alloy containing from 10 to 18% by weight of magnesium and having a temperature of between 800 and 850° C. whereby it is dissolved; adding a further amount of magnesium to obtain approximately a composition corresponding to the zinc-magnesium eutectic, whereby uranium precipitates while plutonium and fission products remain dissolved in the eutectic; and separating the uranium from the eutectic with the plutonium and fission products.

2. The process of claim 1 wherein plutonium and fission products are recovered from the eutectic by evaporation of magnesium and zinc.

3. The process of claim 1 in which the magnesium content ranges between 12 and 14% by weight of the zinc.

4. The process of claim 1 wherein the temperature is approximately 800° C.

5. The process of claim 1 wherein the quantity of zinc added is about five times the weight of uranium.

6. A process of purifying an oxidic neutron-bombarded uranium material, comprising introducing said material into a molten binary zinc-magnesium alloy having a temperature of between 800 and 850° C. and containing magnesium in an amount composed of about the stoichiometric quantity necessary for the reduction of oxides and of a quantity to supply a concentration in the zinc of from 10 to 18% by weight after consumption of said stoichiometric quantity, whereby the oxides are reduced to the metal and the metal is dissolved in the binary alloy; addng a further amount of magnesum to obtain approximately the eutectic zinc-magnesium composition, whereby uranium precipitates while plutonium and fission products remain dissolved in the eutectic; and separating the uranium from the eutectic with the plutonium and fission products.

References Cited in the file of this patent

UNITED STATES PATENTS 2,934,425    Knighton _____ Apr. 26, 1960